United States Patent [19]

Chang

[11] 4,211,733

[45] Jul. 8, 1980

[54] GAS-LIQUID MIXING PROCESS AND APPARATUS

[76] Inventor: Shih-chih Chang, 1725 Davison Ave., Richland, Wash. 99352

[21] Appl. No.: 972,885

[22] Filed: Dec. 26, 1978

[51] Int. Cl.² ............................................. B01F 3/04
[52] U.S. Cl. .................................. 261/36 R; 210/220; 261/119 R; 261/123; 261/DIG. 27; 261/DIG. 75
[58] Field of Search ................... 261/29, 36 R, 119 R, 261/123, DIG. 75, DIG. 27; 210/220

[56] References Cited

U.S. PATENT DOCUMENTS

| | | | |
|---|---|---|---|
| 1,808,956 | 6/1931 | Ketterer | 261/DIG. 75 |
| 2,020,850 | 11/1935 | Myhren et al. | 261/DIG. 75 |
| 2,127,571 | 8/1938 | Pardee, Jr. | 261/DIG. 75 |
| 2,521,215 | 9/1950 | Haddeland et al. | 261/36 R |
| 3,676,075 | 7/1972 | Ploger et al. | 261/36 R X |
| 3,984,323 | 10/1976 | Evens | 261/DIG. 75 |
| 4,000,227 | 12/1976 | Garrett | 261/DIG. 75 |

FOREIGN PATENT DOCUMENTS

| | | | |
|---|---|---|---|
| 236892 | 11/1964 | Austria | 261/DIG. 75 |
| 95365 | 7/1922 | Switzerland | 261/DIG. 75 |

*Primary Examiner*—Richard L. Chiesa

[57] ABSTRACT

A process and apparatus for mixing a gas with a liquid in a reactor vessel, in which a gas-liquid downward flow results in the pressurization of said gas in a separation chamber. The separated liquid in said chamber is injected back into the reactor by a pump means for generating jet streams while the separated gas is introduced into the mixing zones of said jets. The turbulence produced by said jet streams promotes an efficient gas-liquid mass transfer in the reactor vessel.

8 Claims, 1 Drawing Figure

GAS-LIQUID MIXING PROCESS AND APPARATUS

BACKGROUND OF THE INVENTION

Gas-liquid mixing is an important and common unit operation in chemical and allied industries. A common manner of introducing gas to liquid is by injecting compressed gas at a certain depth below the liquid surface through orifices or porous headers. Gas is dissolved by the continuous contacting of the upward moving gas bubbles through the liquid. It is well known that the efficiency in terms of mass of transferred gas per unit power is very low and maintenance cost of such system is high due to the frequent plugging of the distributing headers. This is especially the case when the gas-liquid reaction takes place in the presence of solid suspensions, for example, the aerobic reaction of biological treatment of wastewater. Another disadvantage of this gas-liquid contact system is that it requires very complicated mechanical components which includes gas blowers, gas filtration units, special building for housing the blower and extensive piping and manifold for distributing the gas flow.

Another known means for affecting gas-liquid mixing involves injecting compressed gas through spargers and employing a submerged turbine for breaking the injected gas into small bubbles. In the submerged turbine system gas contacts with liquid in an intensive turbulence zone, and, as a consequence, the efficiency of gas mass transfer is relatively higher. Since the gas is injected through larger sparger openning, the plugging problem is mitigated and therefore eliminating the need for filtration unit. However, the mechanical system is extremely complicated and expensive, since it includes a rotational submerged turbine unit in addition to the gas compression unit.

Jet aeration is another method for transferring gas in liquid which involves recirculating of a portion of the reactor liquid and mixing it with compressed gas in a jet assembly before injecting into the liquid body. The jet aeration system has rather high gas absorption rate and high mass transfer efficiency. However it requires a liquid pumping system in addition to a gas compression system.

It is worthwhile to note that the efficiencies of various gas-liquid transfer systems depend on the depth of the gas injection. In general, mass transfer efficiency and gas absorption rate increases with the injection depth. This is mainly due to the longer retention time of the injected gas bubbles in the liquid and the better utilization of the power employed for gas compression. However there are also limitations and tradeoffs. For example, a commercial centrifugal gas blower can deliver only a given maximum gas pressure which limits the depth of gas penetration. For deeper gas injection extra cost must be spent on multi-stage or more expensive type special gas compressors.

SUMMARY OF THE INVENTION

The object of the present invention is to provide a novel process and apparatus for transferring gas in liquid which combine various advantages of the existing methods but eliminate certain disadvantages.

A specific object of the present invention is to provide a method of transferring gas in liquid wherein the gas is recirculated to mix with liquid by self-entrainment and hydraulic compression so that no mechanical gas blower is required. As a consequence, a great deal of simplification of the mechanical system is achieved.

Another specific object of the present invention is to provide a gas-liquid mixing process wherein the gas is compressed by a two-phase mixing flow so that additional mass transfer is obtained in the gas compression phase and extra high mass transfer efficiency is thereby achieved.

A further specific object of the present invention is to provide a gas-liquid mixing process wherein the gas can be recirculated as frequently as desired so that optimum absorption of the reacting gas can be obtained.

The process described herein comprises continuous circulating of the reactor liquid through a flow conduit which has a substantially vertical section. The circulating liquid flows downwardly in said vertical section. There is a gas tube which connects the gas space of the reactor with the top section of the flow conduit. Gas is continuously entrained in the flow conduit and mixed with the flowing liquid therein. As the gas-liquid mixture flows downwardly it gains pressure due to the change of gravitational position so that the gas in said mixture is pressurized at the lower end of the vertical conduit. The gas and liquid phases are then separated after the mixture enters into a separation chamber which is connected to the lower end of the vertical conduit. The separated gas of said chamber is injected to the reactor liquid via a gas tube by the excessive pressure of the chamber. The pressure of the chamber gas is determined by the relative position of the chamber to the reactor liquid level. The separation chamber must be disposed at a sufficiently low level in order to obtain the desired high pressure so that the the chamber gas can overcome the hydraulic pressure of the reactor liquid at the injection depth. The separated liquid, which occupies the lower portion of the chamber is withdrawn continuously by a pump means and injected to the reactor at certain depth to form mixing jet streams. It is especially advantageous to introduce the gas in the mixing zone of the liquid jet wherein the injected gas is divided by the turbulence of the jet mixing into small bubbles and thereby a highly efficient mass transfer is accomplished by the continuous contact of the gas bubbles with the reactor liquid.

DESCRIPTION OF THE PREFERRED EMBODIMENTS

Figure 1:
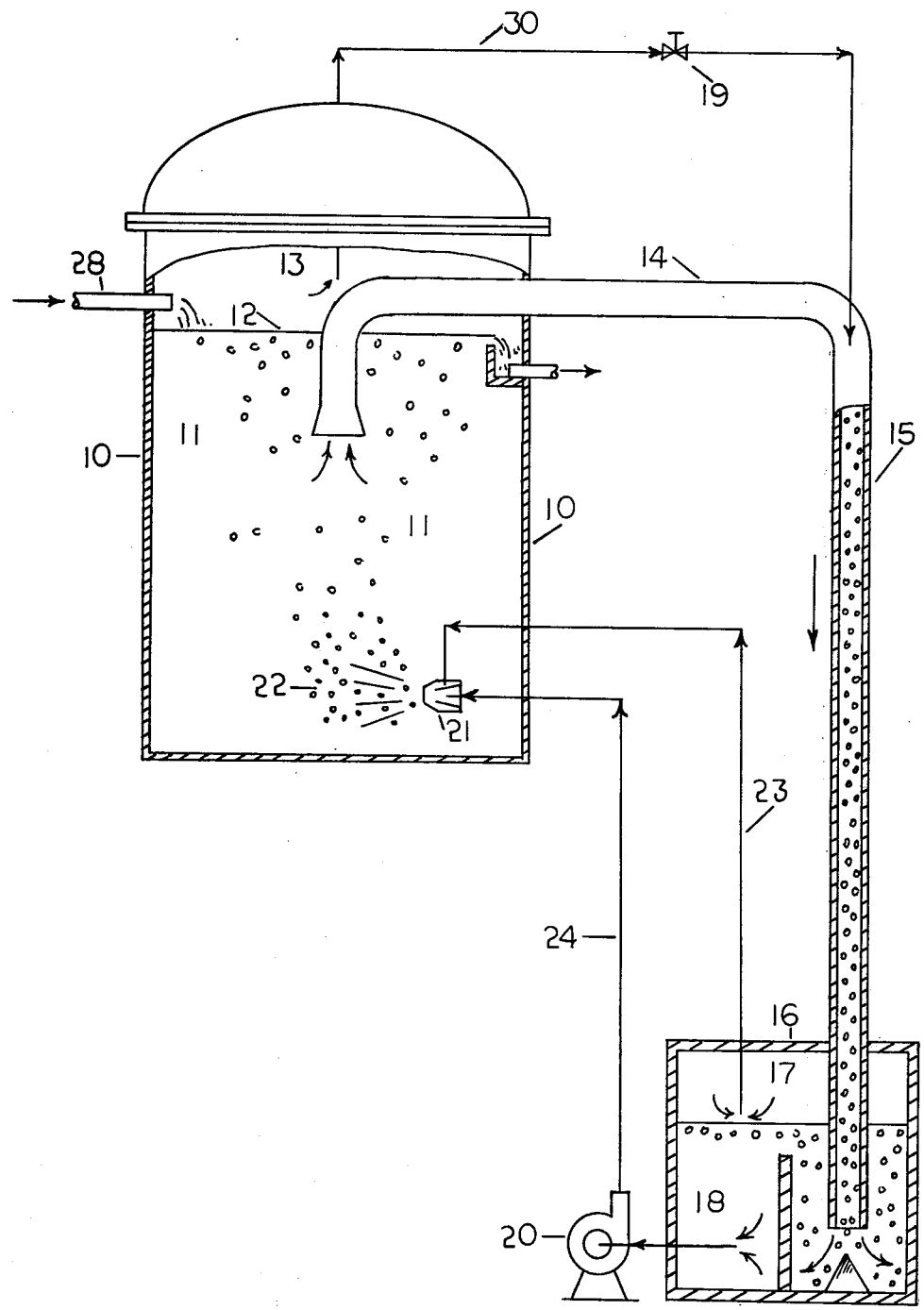

The advantages and special features of the present invention will become more apparent in the light of the following description of an embodiment thereof, as illustrated in the accompanying drawing.

FIG. 1 is a diagrammatic vertical section through a gas-liquid mixing system according to the present invention.

Referring to FIG. 1, the reactor vessel 10 contains a liquid 11 with free surface 12 which is in contact with gas space 13. There is a flow conduit 14 having a substantially vertical drop 15. The inlet of the flow conduit 14 communicates with the reactor liquid and the outlet is connected to a closed chamber 16. Liquid is continuously drawn in the conduit 14 from the reactor 10. There is a gas tube 30 communicating the gas space 13 of the reactor 10 with the interior of the flow conduit 14. The suction force of the liquid flow entrains a gas flow into the conduit 14 and forms a gas-liquid mixture therein. As the two phase mixture flows downwardly in the vertical section 15, the hydraulic pressure increases continuously due to the change of gravitational position. The separation chamber 16 is purposely disposed at a low level so that the desired pressure can be obtained therein. The gas-liquid mixture is separated into gas phase 17 and liquid phase 18 in the separation chamber 16. The pressure of the gas phase 17 is mainly determined by the vertical drop and the gas entrainment rate, where the latter can be controlled by the valve 19. The liquid phase 18 in chamber 16 is continuously withdrawn by a pump 20 which feed the liquid to a jet assembly 21 through a pipe 24 for producing jet stream 22. The gas phase 17 is introduced to the jet assembly 21 through a gas conduit 23 and mixed with the pumped liquid therein. The mixed gas and liquid is subsequently injected to the liquid body 11 through the jet nozzle. The continuous withdrawals of liquid and gas from the separation chamber 16 sustain the circulating flow in the conduit 14 which in turn sustain the continuous operation of the mixing process.

What is claimed is:

1. A process for mixing gas with liquid in a vessel comprising process steps:
    a. affecting an external circulating flow of said liquid in a flow conduit from an inlet of said flow conduit communicating with said liquid in said vessel;
    b. admitting said gas to said circulating flow to affect entraining said gas into said flow conduit and forming a gas-liquid mixture therein;
    c. separating said gas-liquid mixture into gas phase and liquid phase in a closed chamber disposed substantially below the liquid level of said vessel, thereby the pressure of the separated gas in said chamber being substantially higher than the gas pressure of said vessel;
    d. injecting said separated gas of said chamber into said liquid body of said vessel by using the available high pressure of said chamber;
    e. returning said separated liquid of said chamber to said liquid body of said vessel by a pump means to form at least one liquid jet stream in said vessel;
    f. agitating said injected gas with said jet stream to accomplish an effective gas-liquid mixing action.

2. A method according to claim 1, wherein said pump means being a centrifugal pump, said jet stream being generated by injecting said liquid through at least one jet assembly containing a mixing compartment and a jet nozzle said gas phase of said chamber being admitted to said mixing compartment of said jet assembly to mix with said liquid before injecting it to the body of liquid of said vessel.

3. A method according to claim 1 wherein said gas being air, said liquid being wastewater, said vessel being an open top vessel.

4. A process according to claim 1 wherein said gas being oxygen enriched gas, said liquid being wastewater, said vessel being a closed vessel.

5. A process according to claim 1 wherein fresh feeding gas is being introduced to said external circulating flow for gas entrainment.

6. A process according to claim 1 for gas-liquid mixing comprising at least two concurrent stages of said process.

7. A process according to claim 1 for gas-liquid mixing comprising at least two counter-current stages of said process.

8. A vessel for containing said liquid and said gas, at least one flow conduit for guiding a external circulating flow of said liquid; the inlet of said flow conduit communicating with said liquid of said vessel and the outlet of said flow conduit extending to a predetermined depth below the liquid level of said vessel, a gas conduit communicating said gas of said vessel with said flow conduit for admitting gas to the flowing liquid to form a gas-liquid mixture in said flow conduit, a separating chamber connected to said outlet of said flow conduit for separating said gas-liquid mixture into gas phase and liquid phase, a pump means for circulating said liquid phase of said chamber to said vessel through a second flow conduit and at least one jet nozzle to generate at least one jet stream in said vessel, a second gas conduit communicating the gas space of said separating chamber with said liquid of said vessel at a predetermined depth for injecting said gas phase of said chamber to said liquid of said vessel; said liquid jet agitating said injected gas and thereby accomplishing an efficient gas-liquid mixing in said vessel.

* * * * *